United States Patent

Guch, Jr.

[11] Patent Number: 4,558,452
[45] Date of Patent: Dec. 10, 1985

[54] NARROW BANDWIDTH LASER APPARATUS

[75] Inventor: Steve Guch, Jr., Saratoga, Calif.

[73] Assignee: GTE Government Systems Corporation, Stamford, Conn.

[21] Appl. No.: 642,319

[22] Filed: Aug. 20, 1984

[51] Int. Cl.$^4$ .................................................. H01S 3/08
[52] U.S. Cl. .................................. 372/99; 372/56; 372/34; 372/69
[58] Field of Search .................. 372/56, 99, 69, 70, 372/72, 78, 97, 98, 34

[56] References Cited

U.S. PATENT DOCUMENTS

| | | | |
|---|---|---|---|
| 3,471,800 | 10/1969 | Congteton et al. | 372/99 |
| 3,636,474 | 1/1972 | DeMaria et al. | 372/99 |
| 4,019,157 | 4/1977 | Hutchinson et al. | 372/20 |
| 4,435,808 | 3/1984 | Javan | 372/20 |

Primary Examiner—William L. Sikes
Assistant Examiner—Léon Scott, Jr.
Attorney, Agent, or Firm—Douglas M. Gilbert; John F. Lawler

[57] ABSTRACT

Laser apparatus having a very narrow (<1A) spectral output comprises a laser cavity having a metal vapor cell as one of the reflecting elements. This cell reflects the laser beam over a narrow wavelength region in the vicinity of one of the metal vapor's resonant absorption lines and achieves frequency locking to an atomic resonance line without any external frequency sensors or feedback loops.

4 Claims, 1 Drawing Figure

NARROW BANDWIDTH LASER APPARATUS

BACKGROUND OF THE INVENTION

This invention relates to lasers and more particularly to an improved narrow bandwidth laser.

There is a need for a tunable laser having a very narrow spectral output bandwidth in applications such as narrow band communication systems and laser photochemistry. In the past, the output wavelength of such a tunable laser has been narrowed, controlled relative to an external reference, and/or stabilized by use of intracavity elements which introduce differential loss, i.e., low level loss in the spectral region at which output is desired and high loss in such region at which output is to be suppressed. For example, the fine tuning of the emission wavelength of a dye laser, such as a Rhodamine 6G dye laser pumped by a frequency-doubled Nd:YAG laser, is achievable by use of a wavelength selective resonator which is in one of the following classes:

(1) resonators including devices for spatial wavelength separation, (2) resonators incuding devices for interferometric wavelength descrimination, (3) resonators including devices with rotational dispersion, (4) resonators with wavelength-selective distributed feedback.

Some specific wavelength selective techniques that have been used in the past in a tunable dye laser and typical resultant linewidths are as follows:

No narrowing—20A
Single prism—5A
Multiple prism—1A
Diffraction grating only—1A
Telescope plus diffraction grating—0.1A
Telescope plus diffraction grating plus Fabry-Perot etalon—0.01A
 Birefringent filter—0.1A (multi-element)
 Birefringent filter plus Fabry-Perot etalon—0.01A In general the foregoing wavelength selection techniques involve wavelength dependent angular and/or positional deviation in a resonator which then operates at a wavelength at or near a particular angular or positional alignment. For example, tilting an intracavity prism causes a change in the wavelength for which the resonator is aligned in angle, causing a change in output wavelength. Other examples include a grating (tilt in angle), etalon (tilt in angle or change in gas pressure), and a birefringent filter (rotate plates about the beam axis or change voltage on E-O tuning elements).

Stabilization of a tunable laser to correspond precisely to a desired wavelength generally involves use of an external control system of considerable complexity. A sensor detects either the absolute wavelength or its departure from the desired reference. A feedback loop uses the sensor output to generate a signal which represents the magnitude and direction of the wavelength error. A servo system then positions one or more of the spectral control elements within the resonator to adjust the output to the desired wavelength.

The major difficulties inherent in use of the foregoing techniques are complexity and bulk of the equipment, lack of reliability, high costs, and difficulty in installation.

This invention is directed to laser apparatus which avoids the foregoing difficulties and disadvantages.

OBJECTS AND SUMMARY OF THE INVENTION

A general object of the invention is the provision of narrow bandwidth laser apparatus which is relatively simple to construct and at low cost.

A further object is the provision of such apparatus which is relatively insensitive to changes in the environment.

Still another object is the provision of such apparatus which is capable of producing narrow linewidth outputs at a variety of wavelengths.

These and other objects are achieved with laser apparatus having as one of the cavity reflectors a cell containing a metal vapor capable of exhibiting substantial laser beam reflection as a consequence of anomalous dispersion. The laser oscillates at a precise wavelength and bandwidth determined solely by the atomic structure of the metal vapor and requires no sensors or feedback mechanism. Use of resonant reflecting vapors of different metals permits operation at different wavelengths.

The drawing is a schematic representation of laser apparatus embodying the invention.

DESCRIPTION OF PREFERRED EMBODIMENT

Figure 1:
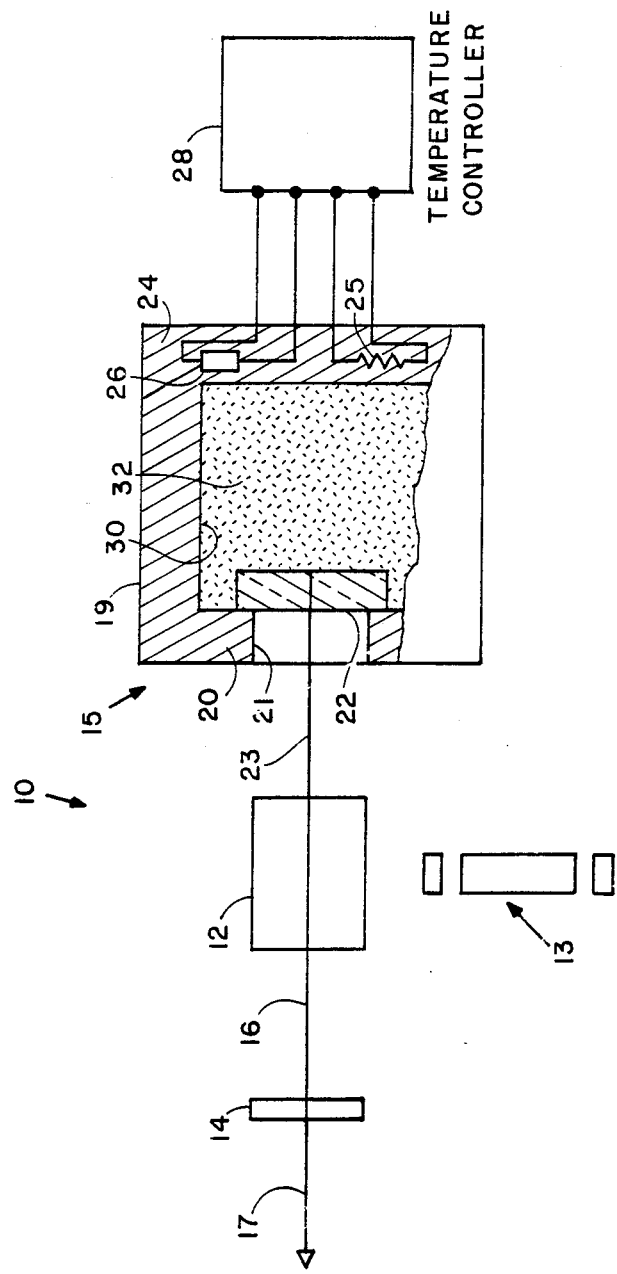

Referring to the drawing, laser apparatus 10 embodying the invention comprises a lasing medium 12, a pumping source 13, and a laser cavity defined by a partially optically transmissive output reflecting element 14 axially aligned with and on one side of medium 12 and a totally reflecting element 15 similarly aligned with and on the opposite side of medium 12. As medium 12 is pumped by source 13, a laser beam 16 is generated by medium 12 and propagates between reflecting elements 14 and 15, a part 17 of which beam is transmitted by element 14 as the laser output. In one embodiment of the invention, medium 12 is a cell containing dye such as Rhodamine B and pump source 13 is a frequency-doubled Nd:YAG laser with an output beam having a wavelength of 532 nanometers directed into an energizing medium 12.

In accordance with this invention, element 15 is both a reflector and a spectral controller and comprises a cell or container 19 having a front wall 20 facing medium 12 and formed with an opening 21 sealed by a transparent window 22 made of silica, glass, or the like. Cell 19 has a rear wall 24 in which are embedded a heater coil 25 and a temperature sensor 26, the coil 25 and sensor 26 being electrically connected to an external temperature controller 28. The interior of cell 19 comprises a sealed chamber 30 in which is disposed a metal selected as described below and formed into a vapor 32 by heater 25 operating at a predetermined temperature maintained by sensor 24 and controller 28. Laser beam 20 is totally reflected by vapor 32.

The vapor in cell 19 is capable of exhibiting substantial laser beam absorption and reflection as a consequence of anomalous dispersion and is formed from a metal which may be selected from a group which includes cesium, mercury, sodium, potassium and copper. As the temperature within the cell is raised, the pressure of vapor 32 increases to or above a temperature, determined by the metal vapor absorption/re-radiation characteristics, at which anomalous dispersion in the cell creates narrow spectral regions in which the refractive index difference between the vapor 32 and window 22 becomes large enough to produce spectrally-localized high reflectively at normal incidence, according to the equation $$R = \left( \frac{n_v - n_g}{n_v + n_g} \right)^2$$

where R is the reflectivity, and $n_v$, $n_g$ are the refractive indices of the metal vapor and the window, respectively. Anomalous dispersion for typical resonance absorbers produces refractive indices which vary with changes in wavelength, but only at wavelengths near the characteristic resonance absorption is anomalous dispersion sufficient to produce large reflectivity. As a consequence, the laser beam produced by oscillations under such conditions, is extremely narrow band. The spectral position of the wavelength is set by the atomic absorption wavelength of the metal vapor and does not change, i.e., is frequency locked, absent extreme deviations in the vapor cell invironment. The laser embodying the invention therefore oscillates at a very narrow band and fixed wavelength without any need for elaborate intracavity or extracavity mechanisms.

The invention may be practiced with lasers having a variety of gain media including but not limited to dye lasers, vibronic solid state lasers, rare gas halide lasers, ion-in-crystal or ion-in-glass solid state lasers, and molecular lasers. In addition, essentially any resonator geometry may be used in the practice of the invention including stable, unstable, single transverse mode, and multiple transverse mode.

What is claimed is:

1. In laser apparatus having a lasing medium, means to pump said medium for producing a laser beam, and a first partially optically transmissive output reflective element on one side of the medium defining one end of the laser cavity, the improvement of a second reflective element on the other side of the medium defining the other end of the laser cavity, said second element comprising:

a cell having a window and containing a metal vapor capable of exhibiting substantial laser beam reflection as a consequence of anomalous dispersion which produces narrow spectral regions in which the refractive index difference between the vapor and cell window becomes large enough to produce spectrally-localized high reflectivity at normal incidence.

2. In laser apparatus having a lasing medium, means to pump said medium for producing a laser beam, and a first partially optically transmissive output reflective element on one side of the medium defining one end of the laser cavity, the improvement of a second reflective element on the other side of the medium defining the other end of the laser cavity, said second element comprising:

a cell containing the vapor of a metal selected from a group consisting of cesium, mercury, sodium, potassium and copper.

3. Laser apparatus according to claim 2 in which said cell has a chamber and heater means adjacent to said chamber, said metal vapor being disposed in said chamber.

4. Laser apparatus according to claim 3 in which said cell has a transparent window facing said medium and traversing said beam.

* * * * *